US012715730B2

(12) United States Patent
Piironen et al.

(10) Patent No.: US 12,715,730 B2
(45) Date of Patent: Aug. 25, 2026

(54) ELEVATOR AND ESCALATOR CONTROL NETWORK MANAGEMENT

(71) Applicant: KONE Corporation, Helsinki (FI)

(72) Inventors: Mikko Piironen, Helsinki (FI); Santtu Koskinen, Helsinki (FI); Mika Belov, Helsinki (FI); Mikko Mattila, Helsinki (FI); Mikko Heiskanen, Helsinki (FI); Ari Koivisto, Helsinki (FI)

(73) Assignee: KONE CORPORATION, Helsinki (FI)

( * ) Notice: Subject to any disclaimer, the term of this patent is extended or adjusted under 35 U.S.C. 154(b) by 578 days.

(21) Appl. No.: 18/079,063

(22) Filed: Dec. 12, 2022

(65) Prior Publication Data

US 2023/0104339 A1 Apr. 6, 2023

Related U.S. Application Data

(63) Continuation of application No. PCT/FI2020/050453, filed on Jun. 24, 2020.

(51) Int. Cl.
*G05B 15/02* (2006.01)
*B66B 1/34* (2006.01)
(Continued)

(52) U.S. Cl.
CPC ................ *B66B 1/34* (2013.01); *G05B 15/02* (2013.01); *G06F 3/04842* (2013.01); *H04L 41/12* (2013.01); *H04L 41/22* (2013.01); *B66B 1/3461* (2013.01); *B66B 3/002* (2013.01); *B66B 25/006* (2013.01); *B66B 27/00* (2013.01)

(58) Field of Classification Search
CPC ......... B66B 1/34; B66B 1/3461; B66B 3/002; B66B 25/006; B66B 27/00; G05B 15/02; G06F 3/04842; H04L 41/12; H04L 41/22; H04L 43/50; H04L 43/0817
See application file for complete search history.

(56) References Cited

U.S. PATENT DOCUMENTS 10,778,537 B1 * 9/2020 Hu ...................... H04L 43/0817
2018/0136809 A1 5/2018 Denneler et al.
(Continued)

FOREIGN PATENT DOCUMENTS

CN 107819629 A 3/2018
WO WO 2020/078535 A1 4/2020

OTHER PUBLICATIONS

International Search Report (PCT/ISA/210), issued in PCT/FI2020/050453, mailed on Mar. 15, 2021.
(Continued)

*Primary Examiner* — Charles R Kasenge
(74) *Attorney, Agent, or Firm* — Birch, Stewart, Kolasch & Birch, LLP

(57) ABSTRACT

A user interface shows status of network elements in an infrastructure network. The network elements are used to provide a communication channel for elevators, escalators and similar. In addition to network elements status of peripheral devices and other elevator and escalator related network connected devices may be shown. The user interface showing the status of network elements and other devices provides the maintenance person an easy way of spotting possible sources of problems.

20 Claims, 5 Drawing Sheets

(51) Int. Cl.

| | |
|---|---|
| ***G06F 3/04842*** | (2022.01) |
| ***H04L 41/12*** | (2022.01) |
| ***H04L 41/22*** | (2022.01) |
| *B66B 3/00* | (2006.01) |
| *B66B 25/00* | (2006.01) |
| *B66B 27/00* | (2006.01) |

(56) References Cited

U.S. PATENT DOCUMENTS

| | | | | |
|---|---|---|---|---|
| 2019/0025062 | A1* | 1/2019 | Young | G01S 19/13 |
| 2019/0339841 | A1* | 11/2019 | Nanjappan | G06F 30/00 |
| 2020/0162337 | A1 | 5/2020 | Jain et al. | |
| 2020/0204457 | A1* | 6/2020 | Hu | H04L 41/22 |
| 2021/0325189 | A1* | 10/2021 | Faustino | G01C 21/206 |

OTHER PUBLICATIONS

Written Opinion of the International Searching Authority for PCT/FI2020/050453 mailed on Mar. 15, 2021.

* cited by examiner

ELEVATOR AND ESCALATOR CONTROL NETWORK MANAGEMENT

CROSS REFERENCE TO RELATED APPLICATION

This application is a Continuation of PCT International Application No. PCT/FI2020/050453, filed on Jun. 24, 2020, which is hereby expressly incorporated by reference into the present application.

DESCRIPTION OF BACKGROUND

The following disclosure relates to managing elevators and escalators. Particularly the disclosure relates to methods and arrangements for managing control networks used in elevators, escalators and similar.

Modern elevators are so called connected devices. Modern elevators do have a plurality of peripheral devices that are or can be connected to each other using different networking solutions. For example, an elevator car may comprise a control panel, emergency phone, information screen, security cameras, network hotspot and other similar peripheral devices that are connected to a data communication network. In addition to the peripheral devices located in the elevator car further connected peripheral devices may be located at landing floors, door frames, hoisting machine and similar. Thus, there is a large number of different peripheral devices that may require a network connection.

Conventionally elevators have had one dedicated connection for transmitting data. However, typically this dedicated has been reserved for the most important devices, such as control panel and emergency phone. This kind of networks typically are dedicated control networks that are accessible only within the building by using a dedicated connector. More recently commonly used network technologies, such as Ethernet, have been used when constructing a control network for elevators and escalators. The elevator and escalator control network (EECN) may be a dedicated and physically separate network segment. If Ethernet is used as the network technology, it is possible to connect the EECN directly to a public network, such as Internet, and control the EECN and the devices connected to the EECN remotely. In such case a virtual private network or similar technology is typically used so that unauthorized persons do have access to the EECN.

The EECN may also be implemented using a building network or common networking in a building. In such case the EECN must be separated from the public network by using virtualization. When using the building network, it is possible to construct smaller physical dedicated segments that are connected to the virtual private network.

One important feature of the EECN is that it must be reliable. Elevators need to be safe for passengers. Thus, in case of problems, there should be a way to solve the problem, preferably so that passengers will not even notice that. One commonly used solution is to increase redundancy in the EECN. This can be done, for example, by adding additional routes for data transmissions from network connected devices. Additional connections may be implemented using same or different network technologies. For example, if a router device in the EECN breaks the data transmissions over the broken router need to be rerouted. The desired level of redundancy may depend on peripherals and devices that are connected to the EECN. Safety and operation critical devices may be connected using two or more routes while a display used for displaying marketing material or other non-elevator related information may be coupled using only one route. Thus, the elevator may remain operational by using a secondary route for critical information.

Because fluent operation and safety is important there is always a need to improve safety related systems. However, elevators form often a critical part of transportation within buildings. Thus, it is desired that the occurrence of safety related faults is minimized so that elevators can be kept operational.

SUMMARY

In the following a user interface showing status of at least one network element in an infrastructure network is disclosed. The network elements are used to provide a communication channel for elevators, escalators and similar. In addition to network elements status of peripheral devices and other elevator and escalator related network connected devices may be shown. The user interface showing the status of network elements and other devices provides the maintenance person an easy way of spotting possible sources of problems.

In an aspect a method for managing an infrastructure network is disclosed. The method comprises retrieving status information from a plurality of network connected devices; generating a topology of a network based on the retrieved status information; and visualizing a view for a user interface based on the generated topology, wherein the visualized view comprises displaying the retrieved status for each network connected device.

It is beneficial to have the state of the infrastructure network visualized on the screen of the device the maintenance person is using. If provides possibility to locate defect or malfunctioning devices and network routes fast and reliably.

In an example the visualizing further comprises: retrieving at least a portion of a layout of a building; retrieving an additional location information for a network connected device indicating location of the network connected device; and associating the retrieved additional location information and the retrieved at least portion of a layout of a building. It is beneficial to associate the network topology with actual layout or a map of the building or premises. This provides a possibility to find the faulty components easily if the maintenance person needs to visit the site where the faulty component is located at.

In an example the method further comprises transmitting the visualized view to a remote device. It is beneficial to transmit the visualized view to a remote device so that the maintenance person does not need to visit the site controller in order to see the view. This is particularly beneficial in large buildings, wherein faulty device may be difficult to find if the exact location is not known.

In an example the visualized view comprises at least one control for controlling a network connected device in the infrastructure network. It is beneficial that the user interface provides means for controlling at least some of the devices in the network.

In an example the method further comprises displaying status of active data communication paths between network connected devices. It is beneficial to show also status of network connections as the problem may be in wiring or deterioration of wireless connection. Furthermore, the data communication paths between different components provide additional information.

In an example the method further comprises displaying navigation information to a selected component. This is particularly beneficial in bigger buildings when the maintenance person is not familiar with the building. Because of navigation the maintenance person does not need to search, and more time will be saved for work.

In an aspect a computer program product comprising computer program code is disclosed. The computer program code is configured to cause performing a method as described above when executed by a computing device.

In an aspect an apparatus comprising a circuitry for executing computer programs is disclosed. The circuitry is configured to: retrieve status information from a plurality of network connected devices; generate a topology of a network based on the retrieved status information; and visualize a view for a user interface based on the generated topology, wherein the visualized view comprises displaying the retrieved status for each network connected device.

In an example the circuitry is further configured to: retrieve at least a portion of a layout of a building; retrieve an additional location information for a network connected device indicating location of the network connected device; and associate the retrieved additional location information and the retrieved at least portion of a layout of a building.

In another example the circuitry is further configured to transmit the visualized view to a remote device. In a further example the visualized view comprises at least one control for controlling a network connected device in the infrastructure network. In another example the circuitry is further configured to display status of active data communication paths between network connected devices. In another example the circuitry is further configured to display navigation information to a selected component.

BRIEF DESCRIPTION OF THE DRAWINGS

The accompanying drawings, which are included to provide a further understanding of the elevator and escalator network management and constitute a part of this specification, illustrate examples and together with the description help to explain the principles of the elevator and escalator network management. In the drawings.

DETAILED DESCRIPTION

Reference will now be made in detail to the examples, which are illustrated in the accompanying drawings.

Figure 1:
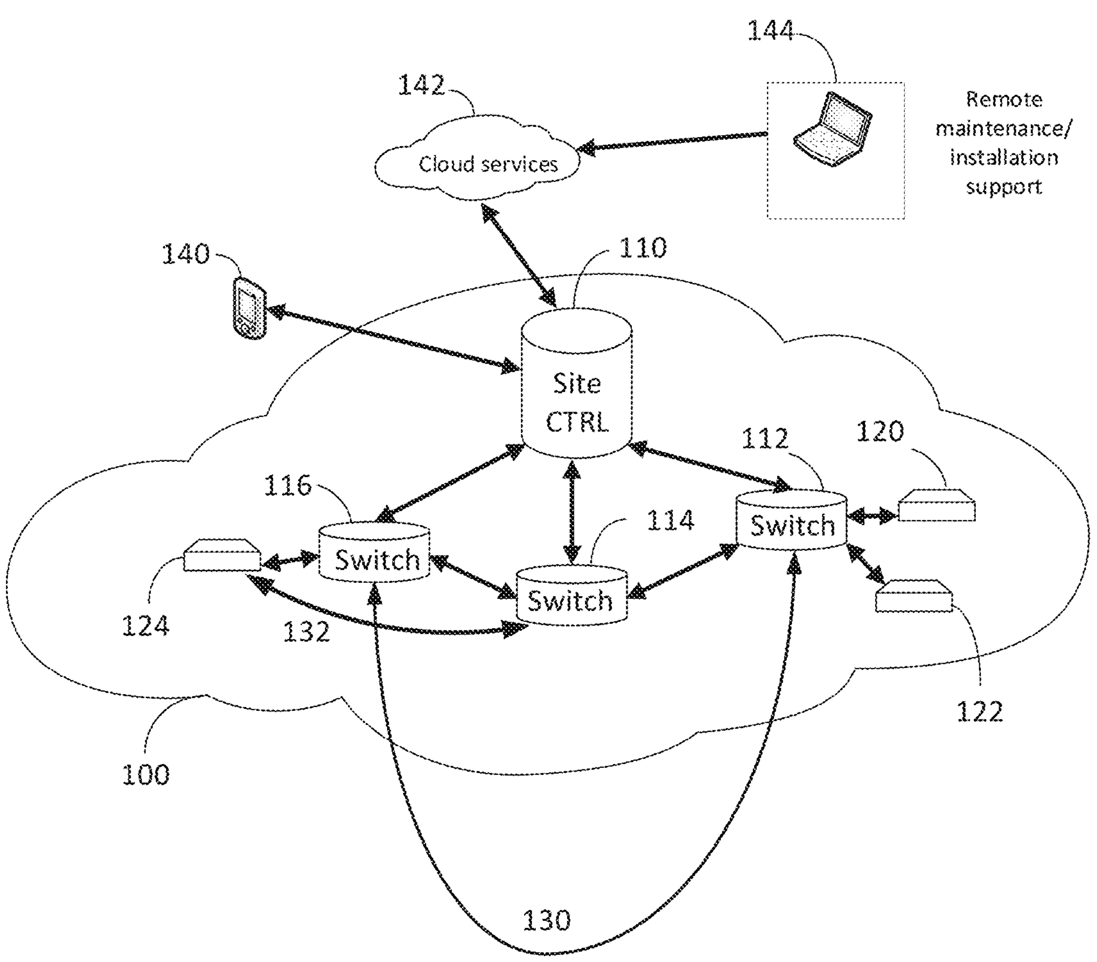
FIG. 1 is a block diagram of an example of an elevator and escalator control network with attached devices.

In FIG. 1 discloses a block diagram of an example of an elevator and escalator control network (EECN) 100. In the example of FIG. 1 additional control devices, like a mobile device 140 or a laptop computer 144 of a maintenance person have been connected to the elevator and escalator network 100. The laptop computer 144 has been connected to the elevator and escalator network through a cloud service 142. The cloud service 142 may be used as an access to one or more elevator and escalator control networks.

In the example of FIG. 1 the EECN 100 comprises a site controller 110 that comprises a circuitry for executing computer programs. This circuitry comprises at least one processor or other means for processing data, at least one memory or means for storing data, a network interface for communicating with other devices and possible additional components. The site controller further comprises one or more software implemented tools for managing the EECN 100. These tools may be specific tools for managing elevators, escalators and similar. These tools may include configuration software for configuring peripherals of elevators and/or escalators, such as peripherals 120-124 shown in the example of FIG. 1. The peripherals 120-124 are connected to the site controller 110 using an ordinary network technology, such as Ethernet. In the example of FIG. 1 switches 112-116 are used to provide the network connection from peripheral devices 120-124 to the site controller 110. Arrows between network elements and peripheral devices represent a network connection. As the EECN needs to be fault tolerant a lot of redundancy has been added to the EECN 100. These arrows showing the network connections between different network elements and peripheral devices are shown as examples.

Each of these network connections as well as network elements forming the network or connected to the network may fail. In case of a network failure the network will try to reroute transmissions using an alternative route. For example, if the connection between the site controller 110 and the switch 116 is unable to carry the transmitted data, it is possible that the alternative route to reach the switch 116 is used. The alternative route may be the switch 114, which then transmits to the switch 116. In the example of FIG. 1 the switch 116 is proving a network access for the peripheral device 124. If there is a failure in the connection between the switch 116 and the site controller 110 the switch 116 can transmit messages between the site controller 110 and the peripheral device 124 over the switch 114. However, it is possible that the switch 116 is not in operational state for some reason, for example, because of a software crash. In the example of FIG. 1 an additional direct connection 132 from the peripheral device 124 to the switch 114 is provided. Thus, if the switch 116 crashes messages between the peripheral device 124 and the site controller 110 can be sent directly to the switch 114 bypassing the switch 116. Similarly, bypassing connection 130 can be used to transmit data between switches 112 and 116.

Rerouting may be performed autonomously or forced by the site controller 110 based on the collected information on available alternative routes. The rerouting function may involve one or more algorithms for detecting an alternative route. These algorithms may take several priorities into account, for example, the current traffic status on different alternative routes. The rerouting function may be implemented in a network element which detects the non-working or incorrectly working route. In a more advanced implementation, it is the site controller 110 that decides to reroute and determines the new route. It is beneficial to do this at the site controller 110 level as the site controller is aware of the operational status of the whole environment. A hybrid approach combining these both is also possible.

The site controller 110 is configured to prepare a user interface displaying the EECN 100 and the state of the network elements of the EECN 100 and the connected peripheral devices. The user interface may be shown at the site controller 110 using a display or it can be transmitted to the mobile device 140 or to the cloud service 142. The cloud service may be accessed, for example, using a laptop computer 144.

Figure 2:
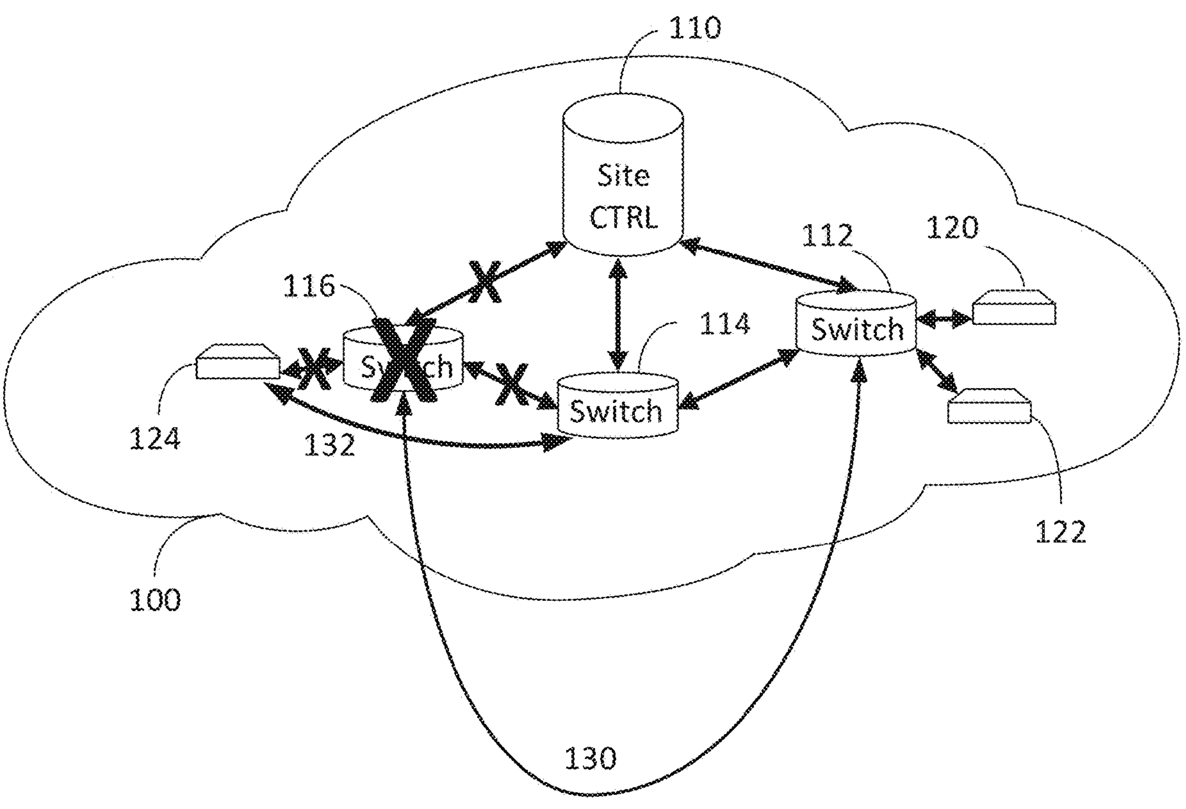
FIG. 2 is a block diagram of an example view of a user interface showing an elevator and escalator control network.

FIG. 2 discloses an example view of a user interface. The example of FIG. 2 shows a view of the EECN shown in FIG. 1. In the example of FIG. 2 the switch 116 is not operational. This is indicated by "X" on the switch 116. Furthermore, as the switch 116 is not operational all connections between the switch 116 and other network elements and devices are not operational. The "X" shown in the example of FIG. 2 may be replaced, for example, using suitable color coding, shading, blinking or anything that can be used to indicate the state of the connection and/or the network element or network connected device. The indication may also have information with regard the fault. In more advanced implementations the user interface may also indicate the needed spare parts or actions that are needed to repair the connection or device. Thus, in the example of FIG. 2, messages between the peripheral device 124 and the site controller 110 are routed over the switch 114. A maintenance person is immediately able to see this from the user interface view of the example. The EECN is still in operational state as the connection 132 is available. The view provides an easy way for detecting that the fault at switch 116 needs to be prepared. As the EECN is still operational the illustrative view provides faster way of detecting the fault. In conventional maintenance methods the fault of the switch 116 might be unnoticed if the connection 132 works.

Figure 3:
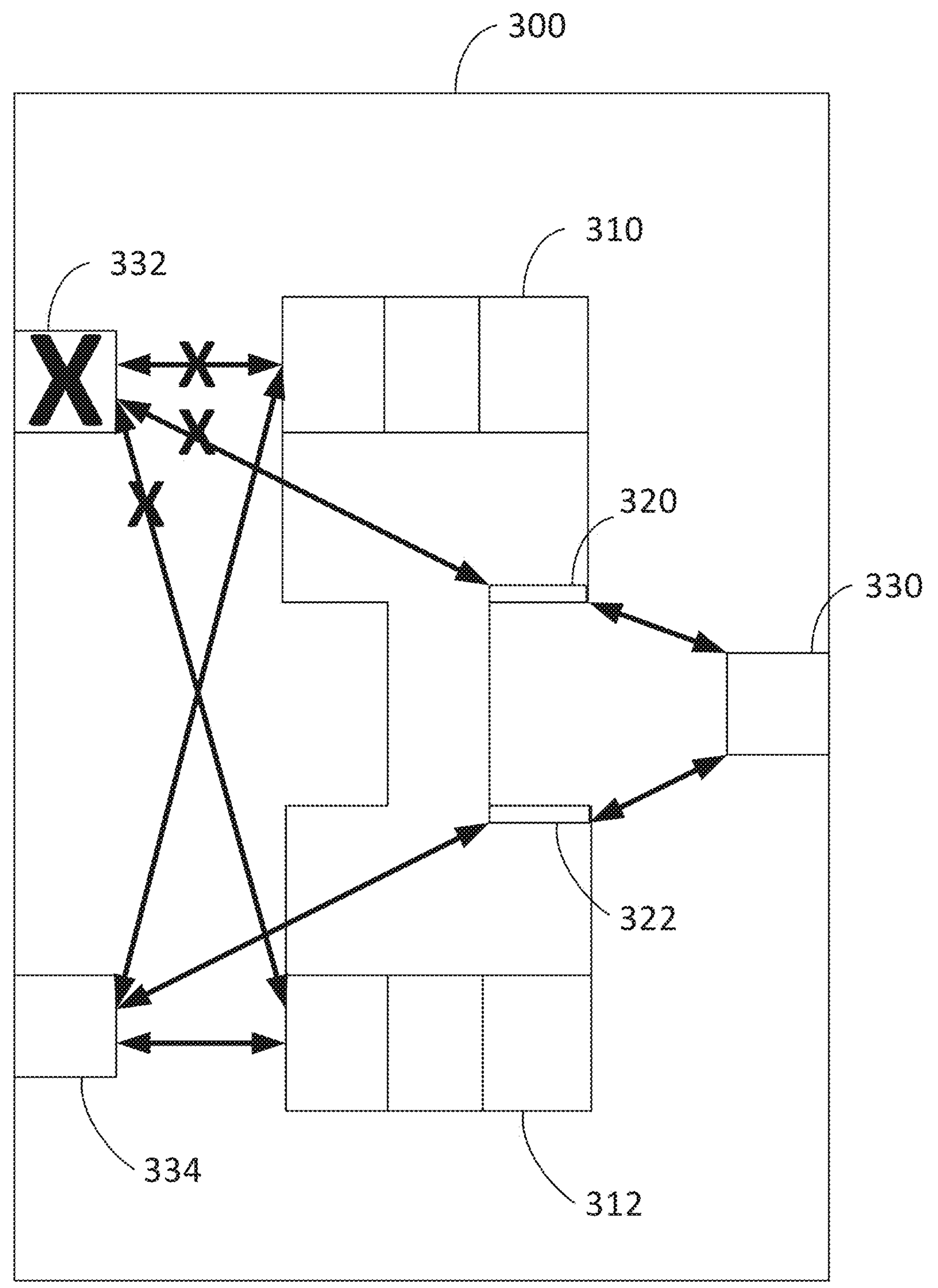
FIG. 3 is a block diagram of an example view of a user interface showing an elevator and escalator control network associated with a floor plan.

In FIG. 3 an example of a different view is shown. In the example of FIG. 3 a floor plan 300 is used in visualizing the user interface. In the floor plan the floor has two elevator groups 310 and 312. The elevator group 310 may be controlled using a control panel 320 and the elevator group 312 respectively using a control panel 322. In the example of FIG. 3 both control panels are coupled to a switch 330. Furthermore, the first control panel 320 is coupled to the switch 332 and the second control panel is coupled to the switch 334. The arrows between the network elements and connected devices illustrate a network connection. The first elevator group 310 is coupled to switches 332 and 334. The second elevator group 312 is coupled to switches 334. In the example of FIG. 3 the functionality relating to elevator groups is limited to floor specific operations, for example, connection to landing doors, analytics tools, information displays at the landing doors and similar. Connection to hoisting machines and other equipment for overall operation of the elevator groups is handled similarly in a floor comprising the respective connections.

In the example of FIG. 3 the floorplan may be a technical drawing used when the building has been constructed. Thus, the view may have additional information that is not shown here for clarity reasons. The additional information may be shown, for example, in light gray so that it does not disturb the visibility of items that are essential for the EECN. In order to include this information the network elements and peripheral devices may have a location information comprising, for example, a floor number, a block number, coordinates or any other information that helps positioning of network elements and peripheral devices, such as the switches, elevator groups or control panels shown in FIG. 3.

In the example of FIG. 3 the switch 332 is not operational. Thus, all connections between a connected device and the switch 332 are marked with "X". This means that the first elevator group 310 only one connection over switch 334 and the first control panel 320 has only one connection over switch 330. As the connected devices still have a working network connection the service level remains the same. However, maintenance of switch 332 is important because if switch 330 stops working the control panel 320 does not have working connection. Accordingly, if switch 334 stops working both of the elevator groups do not have a working connection. When the floor plan is used as a view in the user interface the maintenance person can easily locate the non-working network element 332. For larger buildings the system can even include an indoor navigation possibility. The indoor navigation system may use known and available positioning means, such as known locations of wireless network elements and/or satellite positioning systems if they are available through windows or other openings. The maintenance person may trigger the navigation by choosing a destination network element to be reached.

In the examples above controls for managing network elements and other components are not shown. In case of a fault network elements and other devices may still be reachable so that a maintenance person can connect to the faulty device and search for a reason of the fault. For example, sometimes software modules or drivers may cause a problem that can be solved by restarting respective modules or the whole device. In such cases the user interface may provide a link to the device user interface or the device user interface may be integrated into the user interface provided by the site controller.

Figure 4:
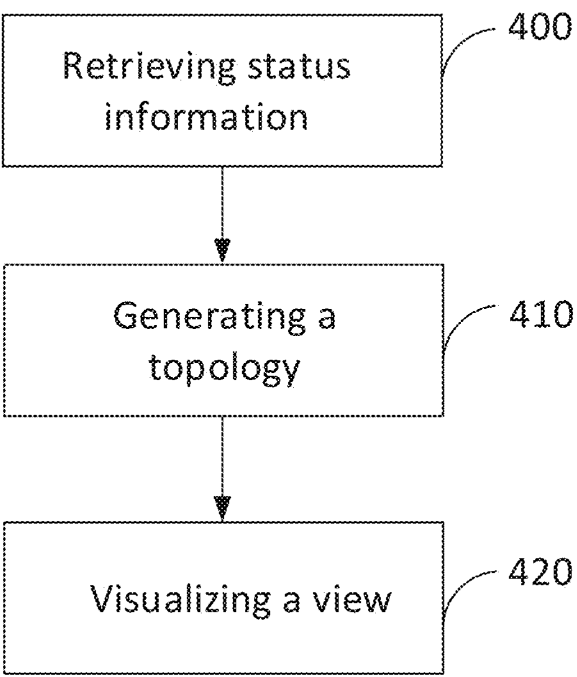
FIG. 4 is a flow chart of a method according to an example.

FIG. 4 shows an example of a method which may be used in order to generate a user interface like the examples of earlier figures. The method is initiated by retrieving status information, step 400. This may be done by traversing through each network element in the network and detecting routes between network elements. A detected route is a route that is used in traversing. The network may use additional routes that may also be traversed in order to complement the information showing currently actively used routes. The retrieving of information may be done using link detection protocol. Link detection protocol can identify on port level devices connected to ports of a network element, such as a switch, router or node. The connected device may be a peripheral device, such as, a control panel, information display or any other device attached to the elevator. Traversing includes detection of all connected devices. Additionally, traversing may include testing if the connected device responds to requests appropriately.

Based on the received responses a topology of the network is generated, step 410. The topology shows all attached devices and how they are connected to each other. This topology is then visualized so that it can be used as a part of the user interface, step 420. The visualization of the generated topology includes the retrieved status information so that the maintenance person can immediately see which part of the infrastructure network, such as the EECN of earlier examples, is working and where the problems are located. This visualization provides a good tool for detecting problems before they escalate and prevent operation of the elevator and escalator arrangements.

Figure 5:
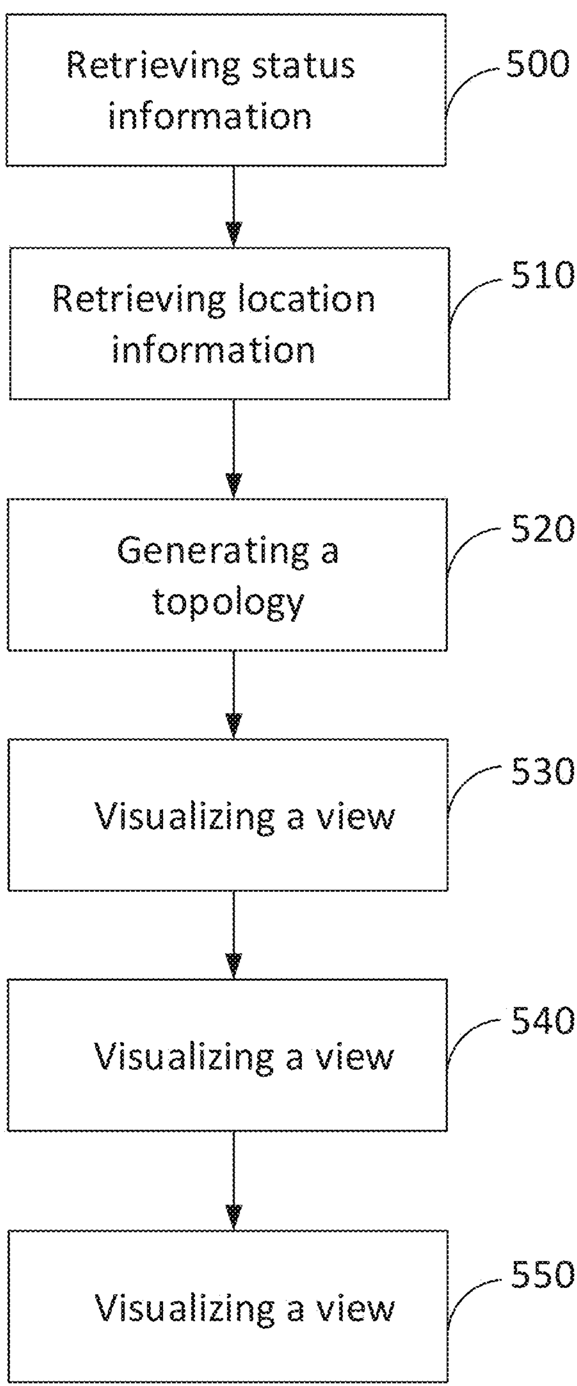
FIG. 5 is a flow chart of a method according to an example.

In FIG. 5 a more sophisticated example is shown. The method starts as in the example of FIG. 4 by retrieving status information, step 500. The method is then continued by retrieving location information, step 510. Location information may be coarse or very specific. For example, it may include just the floor to which the network element is installed or very specific information, for example, by identifying the equipment space or room to which it is installed. When the information is retrieved the topology of the network is generated, step 520. The topology and the location information are then used in associating the network elements with a floor plan or view, step 530. This association is then visualized to be used as a view in the user interface, step 540. The maintenance person using this visualized view can locate possible source of problems by looking where non-working network element is located. In even more sophisticated example, particularly in buildings with large footprint, the method may be continued so that the user interface provides the maintenance person navigation instructions, step 550, for reaching the source of problems from the current location.

The above examples are beneficial in many circumstances. In the following one example is explained in more detail. The user interface as described above is used for managing an infrastructure network in a building. In the building a fire emerges, and fire department is required to distinguish the fire. The fire department disconnects the building, or a part of the building, from the electricity network. This causes the infrastructure network to shut down. After the fire has been distinguished the building is reconnected to the electricity network. This should cause the restarting the infrastructure network, however, in case of complicated networks the network elements may need to be restarted in a specific order. Thus, when the all network elements are started at the same time some of the network elements may not start appropriately. Because of this all connections between network elements and peripheral devices might not work. The user interface as discussed above shows immediately to the maintenance person where the possible fault is located.

The above-mentioned method may be implemented as computer software which is executed in a computing device which is capable of communicating with other devices. When the software is executed in a computing device it is configured to perform the above described inventive method. The software is embodied on a computer readable medium so that it can be provided to the computing device, such as the site controller 110 of FIG. 1.

As stated above, the components of the examples can include computer readable medium or memories for holding instructions programmed according to the teachings of the present embodiments and for holding data structures, tables, records, and/or other data described herein. Computer readable medium can include any suitable medium that participates in providing instructions to a processor for execution. Common forms of computer-readable media can include, for example, a floppy disk, a flexible disk, hard disk, magnetic tape, any other suitable magnetic medium, a CD-ROM, CD±R, CD±RW, DVD, DVD-RAM, DVD±RW, DVD±R, HD DVD, HD DVD-R, HD DVD-RW, HD DVD-RAM, Blu-ray Disc, any other suitable optical medium, a RAM, a PROM, an EPROM, a FLASH-EPROM, any other suitable memory chip or cartridge, a carrier wave or any other suitable medium from which a computer can read.

It is obvious to a person skilled in the art that with the advancement of technology, the basic idea of the elevator and escalator network management may be implemented in various ways. The elevator and escalator network management and its embodiments are thus not limited to the examples described above; instead they may vary within the scope of the claims.

The invention claimed is:

1. A method for managing an infrastructure network:

retrieving status information from a plurality of network connected devices in an elevator and/or escalator control network, the status information being operational status information indicating whether a specific node or link is operational or not;

retrieving at least a portion of a floor layout of a building;

retrieving physical location information for at least one of the plurality of network connected devices;

generating a topology of a network overlaid on said portion of the floor layout of the building and showing the physical location information of the at least one of the plurality of network connected devices based on the retrieved status information and physical location information; and visualizing a view for a user interface based on the generated topology, wherein the visualized view comprises displaying the retrieved status for each network connected device, wherein the network connected devices include at least one network switch or router, and the topology is generated by traversing network elements to detect active and alternative data communication routes.

2. The method according to claim 1, wherein visualizing further comprises:

retrieving at least a portion of a layout of a building;

retrieving an additional location information for a network connected device indicating location of the network connected device; and associating the retrieved additional location information and the retrieved at least portion of a layout of a building.

3. The method according to claim 1, wherein the method further comprises transmitting the visualized view to a remote device.

4. The method according to claim 1, wherein the visualized view comprises at least one control for controlling a network connected device in the infrastructure network.

5. The method according to claim 1, wherein the method further comprises displaying status of active data communication paths between network connected devices.

6. The method according to claim 1, wherein the method further comprises displaying navigation information to a selected component.

7. A non-transitory computer readable medium storing a computer program product comprising computer program code, which is configured to cause performing a method according to claim 1, when executed by a computing device.

8. An apparatus comprising a circuitry for executing computer programs, wherein the circuitry is configured to:

retrieve status information from a plurality of network connected devices in an elevator and/or escalator control network, the status information being operational status information indicating whether a specific node or link is operational or not;

retrieve at least a portion of a floor layout of a building;

retrieve physical location information for at least one of the plurality of network connected devices;

generate a topology of a network overlaid on said portion of the floor layout of the building and showing the physical location information of the at least one of the plurality of network connected devices based on the retrieved status information and physical location information; and visualize a view for a user interface based on the generated topology, wherein the visualized view comprises displaying the retrieved status for each network connected device, wherein the network connected devices include at least one network switch or router, and the topology is generated by traversing network elements to detect active and alternative data communication routes.

9. The apparatus according to claim 8, wherein the circuitry is further configured to:

retrieve at least a portion of a layout of a building;

retrieve an additional location information for a network connected device indicating location of the network connected device; and associate the retrieved additional location information and the retrieved at least portion of a layout of a building.

10. The apparatus according to claim 8, wherein the circuitry is further configured to transmit the visualized view to a remote device.

11. The apparatus according to claim 8, wherein the visualized view comprises at least one control for controlling a network connected device in the infrastructure network.

12. The apparatus according to claim 8, wherein the circuitry is further configured to display status of active data communication paths between network connected devices.

13. The apparatus according to claim 8, wherein the circuitry is further configured to display navigation information to a selected component.

14. The method according to claim 2, wherein the method further comprises transmitting the visualized view to a remote device.

15. The method according to claim 2, wherein the visualized view comprises at least one control for controlling a network connected device in the infrastructure network.

16. The method according to claim 3, wherein the visualized view comprises at least one control for controlling a network connected device in the infrastructure network.

17. The method according to claim 2, wherein the method further comprises displaying status of active data communication paths between network connected devices.

18. The method according to claim 3, wherein the method further comprises displaying status of active data communication paths between network connected devices.

19. The method according to claim 1, wherein the method further comprises displaying at least one alternative route for a rerouting transmission for said at least one of the plurality of network connected devices.

20. A method for managing an infrastructure network:

retrieving status information from a plurality of network connected devices in an elevator and/or escalator control network;

retrieving at least a portion of a floor layout of a building;

retrieving physical location information for at least one of the plurality of network connected devices;

generating a topology of a network overlaid on said portion of the floor layout of the building and showing the physical location information of the at least one of the plurality of network connected devices based on the retrieved status information and physical location information;

visualizing a view for a user interface based on the generated topology, wherein the visualized view comprises displaying the retrieved status for each network connected device; and displaying at least one alternative route for a rerouting transmission for said at least one of the plurality of network connected devices.

* * * * *